US 8,983,247 B2

(12) United States Patent
Hofrichter et al.

(10) Patent No.: US 8,983,247 B2
(45) Date of Patent: Mar. 17, 2015

(54) ELECTROMAGNETIC WAVE ISOLATOR AND INTEGRATED OPTICS DEVICE

(75) Inventors: Jens Hofrichter, Rueschlikon (CH); Nikolaj Moll, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 13/500,990

(22) PCT Filed: Sep. 24, 2010

(86) PCT No.: PCT/IB2010/054307
§ 371 (c)(1),
(2), (4) Date: Apr. 9, 2012

(87) PCT Pub. No.: WO2011/045693
PCT Pub. Date: Apr. 21, 2011

(65) Prior Publication Data
US 2012/0189246 A1     Jul. 26, 2012

(30) Foreign Application Priority Data
Oct. 12, 2009   (EP) .................... 09172760

(51) Int. Cl.
*G02B 6/26* (2006.01)
*G02B 6/42* (2006.01)
*G02B 6/12* (2006.01)
*G02F 1/09* (2006.01)

(52) U.S. Cl.
CPC .......... *G02B 6/4208* (2013.01); *G02B 6/12007* (2013.01); *G02F 1/093* (2013.01)
USPC .......................................... 385/27

(58) Field of Classification Search
None
See application file for complete search history.

(56) References Cited

U.S. PATENT DOCUMENTS

| | | | |
|---|---|---|---|
| 3,513,413 A | 5/1970 | Nakahara et al. | |
| 5,267,078 A | 11/1993 | Shiraishi et al. | |
| 5,574,595 A | 11/1996 | Kurata et al. | |
| 5,764,681 A | 6/1998 | Ballantyne et al. | |
| 6,559,949 B1 * | 5/2003 | Numai ........................ | 356/459 |
| 6,603,557 B2 * | 8/2003 | Mizutani ..................... | 356/459 |
| 6,741,354 B2 * | 5/2004 | Numai ........................ | 356/461 |
| 7,113,676 B2 | 9/2006 | Piede et al. | |

(Continued)

FOREIGN PATENT DOCUMENTS

| | | |
|---|---|---|
| DE | 69228422 T2 | 9/1999 |
| EP | 1 560 048 B1 | 8/2005 |

(Continued)

OTHER PUBLICATIONS

English language Abstract of DE 69228422 T2.
(Continued)

*Primary Examiner* — Sung Pak
(74) *Attorney, Agent, or Firm* — Scully, Scott, Murphy & Presser, P.C.; Gail H. Zarick, Esq.

(57) ABSTRACT

An electromagnetic wave isolator (10) comprising a body (29) having e.g. an elliptical disk or ring shape such as to define two circular directions (D1, D2) of propagation. The body is further augmented by one or more feature (21, 22) lowering the symmetry of the isolator such that wave propagation is supported substantially more in one (D1) of the directions than in the opposite direction (D2). An integrated optics device includes two electromagnetic wave isolators.

18 Claims, 10 Drawing Sheets

(56) References Cited

U.S. PATENT DOCUMENTS

| | | | |
|---|---|---|---|
| 7,609,915 | B2 | 10/2009 | Shvets |
| 2006/0140539 | A1* | 6/2006 | Lee et al. ............... 385/43 |
| 2008/0131049 | A1 | 6/2008 | Koch et al. |
| 2009/0028504 | A1 | 1/2009 | Wu et al. |

FOREIGN PATENT DOCUMENTS

| | | |
|---|---|---|
| JP | H11248950 A | 9/1999 |
| JP | H11248952 A | 9/1999 |
| JP | 2000205864 A | 7/2000 |

OTHER PUBLICATIONS

Zaman et al., "Proposal for a Polarization-Independent Integrated Optical Circulator". IEEE Photonics Technology Letters, 18(12), 1359-1361, (2006).

Bahlmann et al., "Nonreciprocal coupled waveguides for integrated optical isolators and circulators for TM-modes". Optics Communications, 161(4-6), 330-337, (1999).

Zaman et al., "Integrated Optical Circulator in InP", Conference on Lasers and Electro-Optics CLEO, 2, 1321-1323, (2005).

Lee et al., "Reciprocal transmissions and asymmetric modal distributions in waveguide-coupled spiral-shaped microdisk resonators", Optics Express 15(22), 14650-14666, (2007).

Yu et al., "Complete optical isolation created by indirect interband photonic transitions". Nature photonics 3, 91-94, (2009).

Hill et al., "All-optical memory based on coupled microring lasers". Nature 432, 206-209 (2004).

Shvets, "Optical polarizer/isolator based on a rectangular waveguide with helical grooves", Applied Physics Letters, AIP, American Institute of Physics, Melville, NY, US, vol. 89, No. 14, Oct. 6, 2006, pp. 141127- to 141127-3.

Montoya et al., "Surface plasmon isolator based on nonreciprocal coupling", Journal of Applied Physics, New York, US, vol. 106, No. 2, Jul. 23, 2009, pp. 23108-1 to 23108-6.

International Search Report PCT/IB2010/054307, filing date Sep. 24, 2010.

* cited by examiner

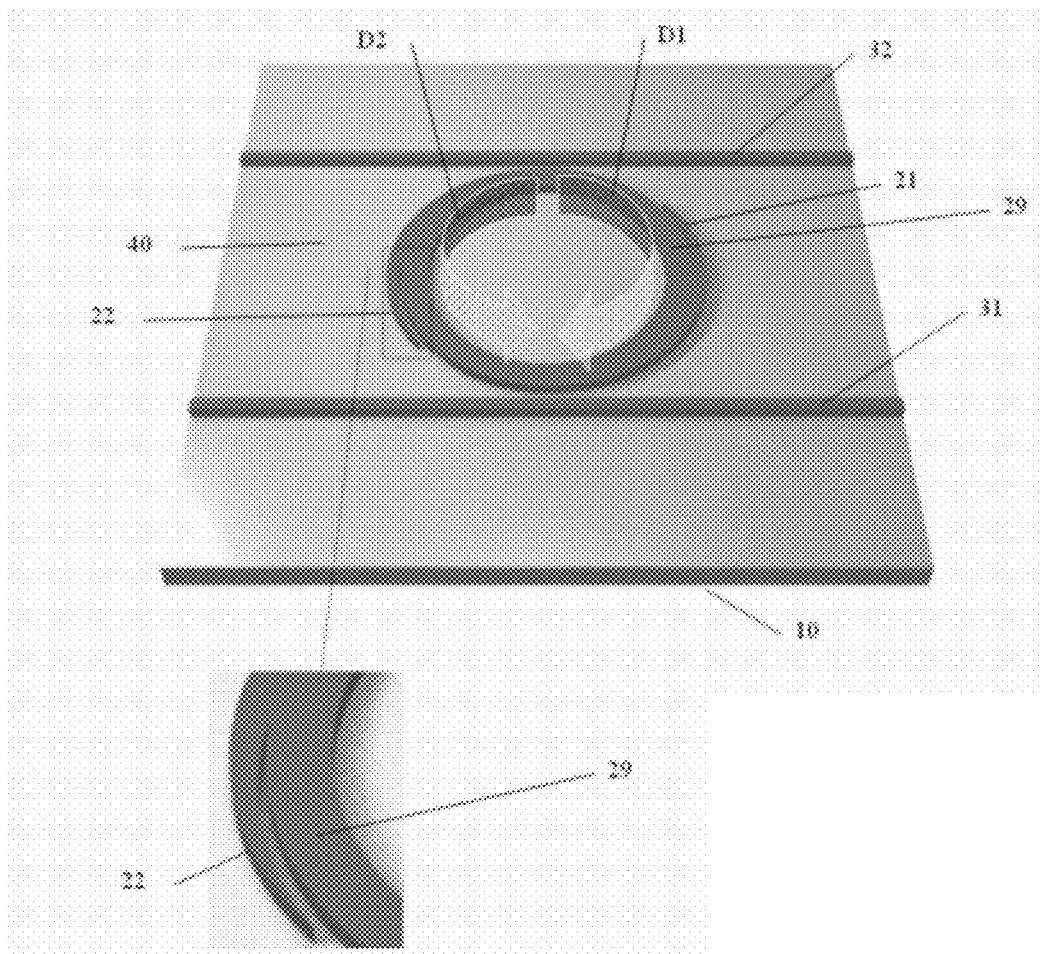
FIG. 2.A

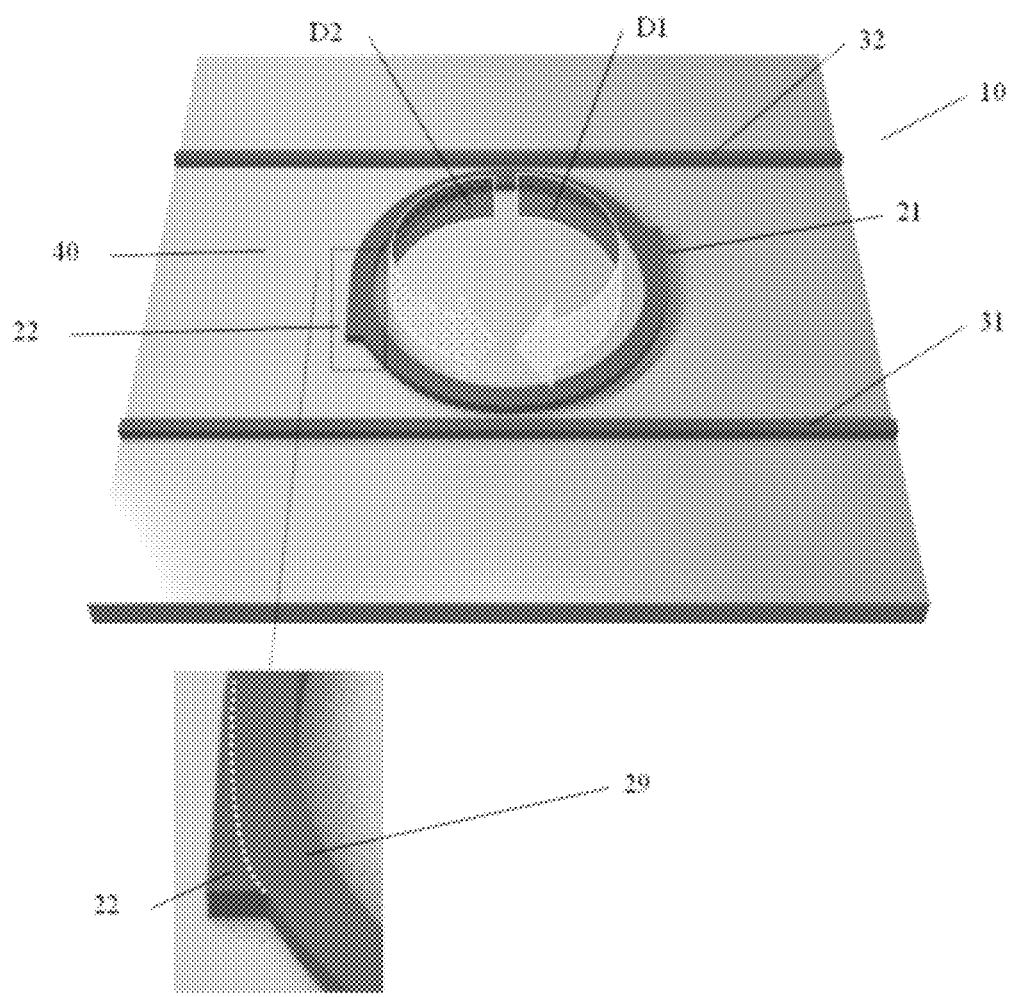
FIG. 2.B

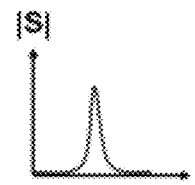
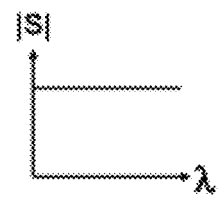
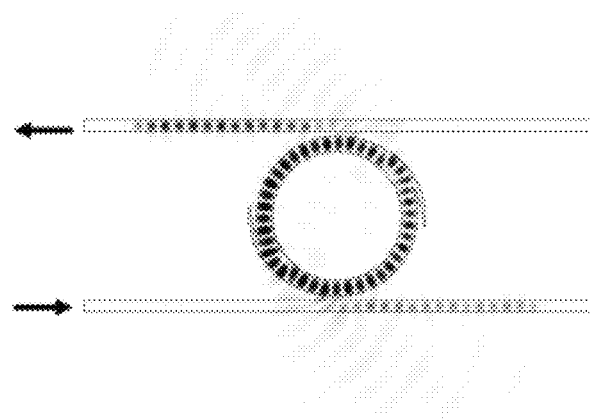
FIG. 4.C
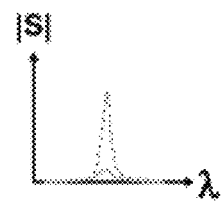
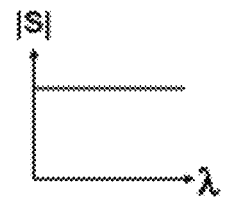
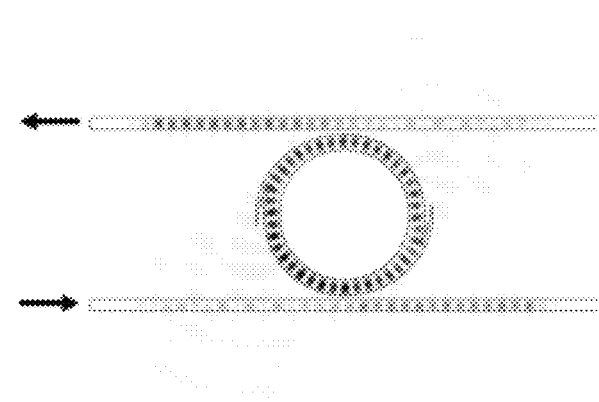
FIG. 5.C

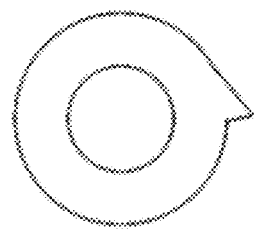
FIG. 7.A
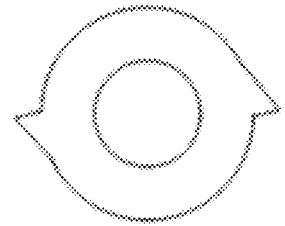
FIG. 7.B
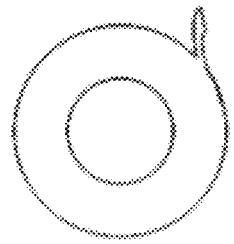
FIG. 8.A
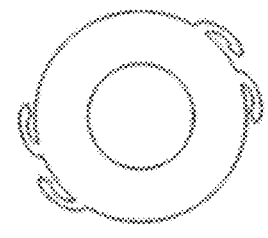
FIG. 8.B
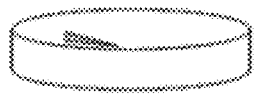
FIG. 9.A
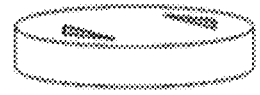
FIG. 9.B
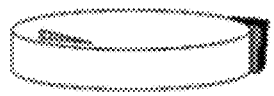
FIG. 10.A
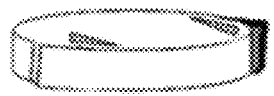
FIG. 10.B

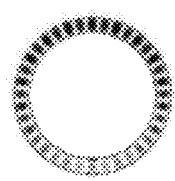
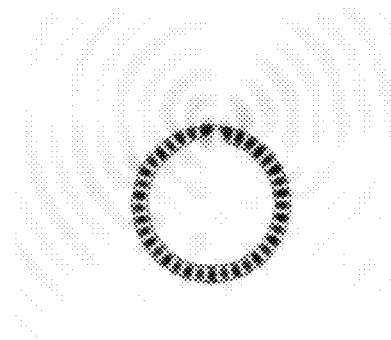
FIG. 11.A          FIG. 11.B
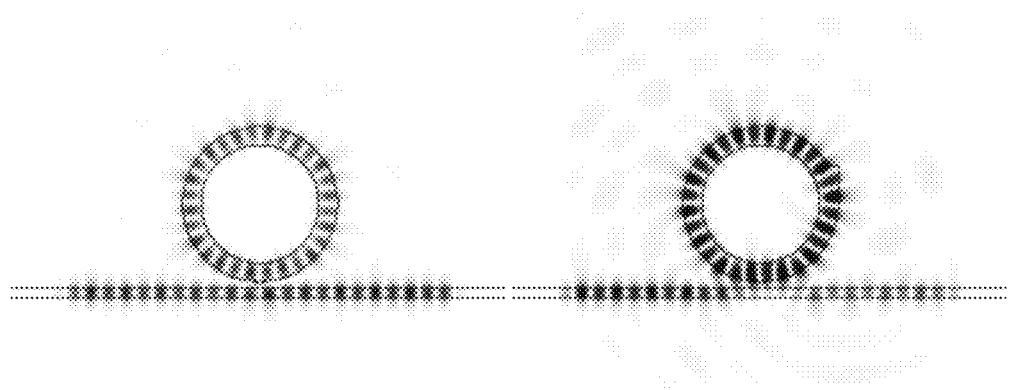
FIG. 12.A          FIG. 12.B

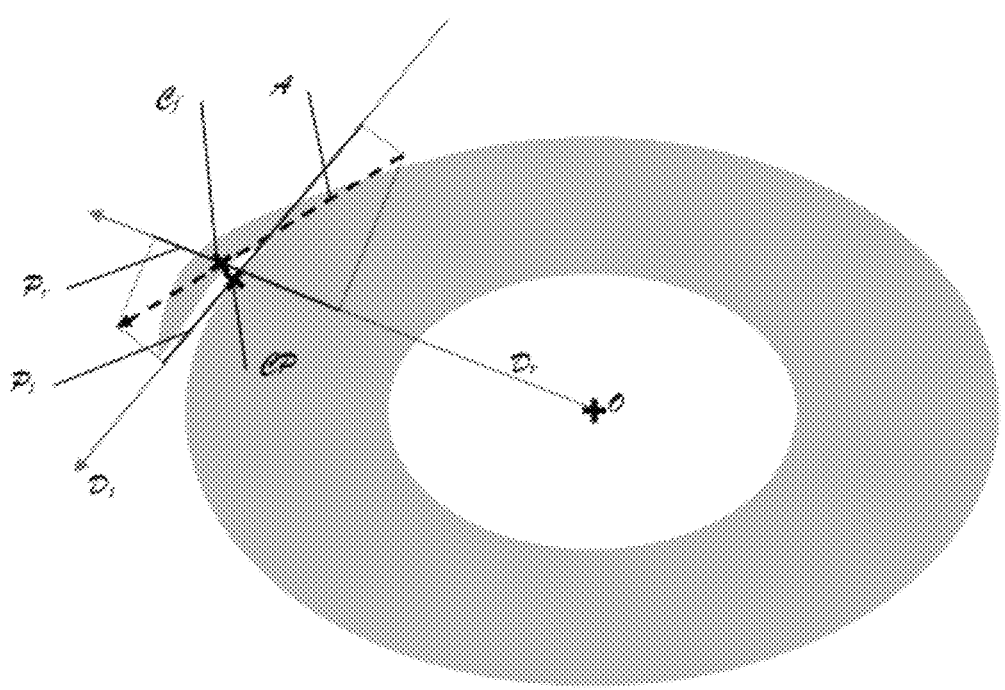
FIG. 13.A

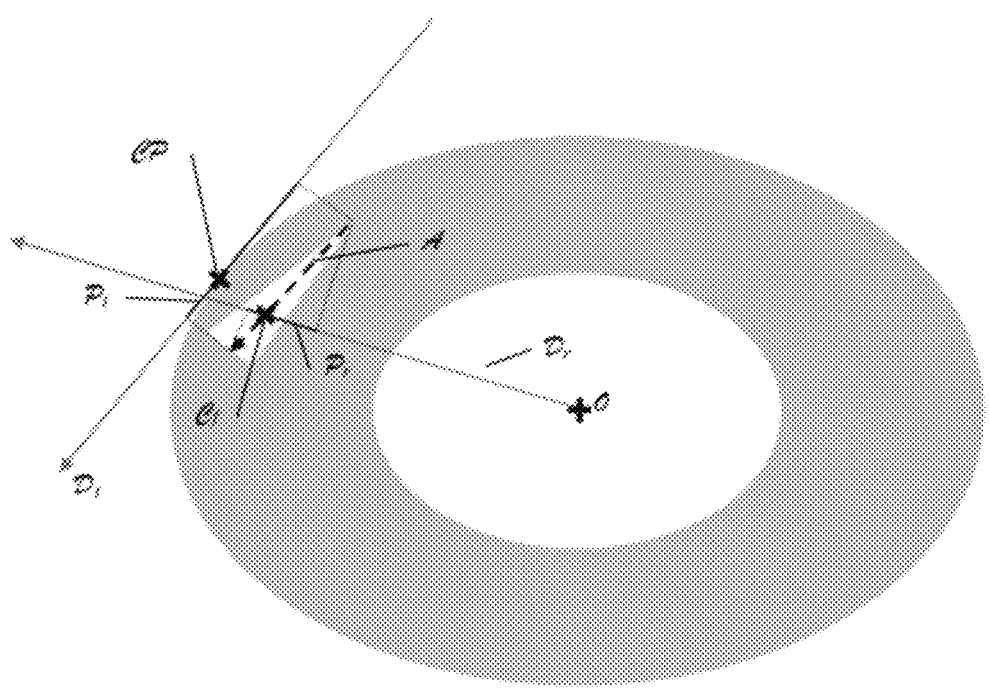
FIG. 13.B

ELECTROMAGNETIC WAVE ISOLATOR AND INTEGRATED OPTICS DEVICE

CROSS-REFERENCE TO RELATED APPLICATIONS

The present invention relates to and claims the benefit of the filing date of commonly-owned, co-pending PCT Patent Application No. PCT/IB2010/054307, filed Sep. 24, 2010, which further claims the benefit of priority date of commonly-owned, co-pending European Patent Application No. CN 09172760.2, filed on Oct. 12, 2009, the entire contents and disclosure of which is incorporated by reference as if fully set forth herein.

FIELD OF THE INVENTION

The invention relates to the field of electromagnetic wave isolators, e.g. optical isolators. In particular, it can be used in an integrated optics device.

BACKGROUND OF THE INVENTION

There are applications wherein backward propagation of a wave signal is prevented such as to suppress cross-talk and interferences. Basically, if light can travel from A to B, it can also travel from B to A. Breaking this law can be achieved thanks to an optical isolator or optical diode, i.e. an optical component which allows the transmission of light in only one direction. Such devices mostly rely on the Faraday effect (a magneto-optic effect). However, they are generally polarization dependent. Should the polarization problem be overcome, it remains that such devices are not suited for integration and can thus not be contemplated for applications such as optical signal processing on-chip and integrated optics in general.

The following patent documents provide interesting details as to the background art in the field:

U.S. Pat. No. 5,574,595: discloses a method for polarization independent optical isolation based on magneto-optic effect;

U.S. Pat. No. 5,267,078: proposes a system comprising polarization splitters for selective isolation of different polarization states of light;

U.S. Pat. No. 7,113,676 is directed to a planar waveguide optical isolator in thin silicon-on-insulator (SOI) structure; and U.S. Pat. No. 5,764,681 suggests a directional control method and apparatus for ring laser using separate mirrors.

As a matter of fact, a solution which is both cost-efficient and all the more compatible with CMOS technology is hard to obtain.

Next, in addition to patent literature, a number of publications are devoted to the subject, for instance:

[1] T. R. Zaman, X. Guo and R. J. Ram: "Proposal for a Polarization-Independent Integrated Optical Circulator". IEEE Photonics Technology Letters, 18(12), 1359-1361, (2006).

[2] N. Bahlmann, M. Lohmeyer, A. Zhuromskii, H. Doetsch and P. Hertel: "Nonreciprocal coupled waveguides for integrated optical isolators and circulators for TM-modes". Optics Communications, 161(4-6), 330-337, (1999).

[3] T. Zaman, X. Guo and R. J. Ram, "Integrated Optical Circulator in InP", Conference on Lasers and Electro-Optics CLEO, 2, 1321-1323, (2005).

[4] J. Y. Lee, X. Luo and A. W. Poon, Reciprocal transmissions and asymmetric modal distributions in waveguide-coupled spiral-shaped microdisk resonators, Optics Express 15(22), 14650-14666, (2007).

[5] Z. Yu and S. Fan, "Complete optical isolation created by indirect interband photonic transitions". Nature photonics 3, 91-94, (2009).

[6] M. T. Hill, H. J. S. Dorren, T. de Vries, J. M. Leijtens, J. H. den Besten, B. Smalbrugge, Y.-S. Oei, H. Binsma, G.-D. Khoe and M. K. Smit. "All-optical memory based on coupled microring lasers". Nature 432, 206-209 (2004).

In particular, the solution in Ref. [1] is manifestly not compatible with CMOS/silicon photonics. The solution proposed in Ref. [5] requires a variation of the index of refraction (i.e. of the material) and a successive filter.

BRIEF SUMMARY OF THE INVENTION

In one aspect, the present invention is embodied as an electromagnetic wave isolator comprising a body having a given symmetry and defining two directions of electromagnetic wave propagation, wherein the isolator further comprises one or more feature configured to lower the symmetry of the body, such that wave propagation is supported substantially more in one of the directions than in the other of the directions.

In embodiments, the isolator may comprise one or more of the following features:

the feature is further configured such that the isolator is chiral in the plane containing the largest common section of the body and the feature;

the body defines a loop, the two directions being two opposite directions corresponding to that loop;

the body has an elliptical disk or ring shape, and the isolator is configured such that, in the plane containing the largest common section of the body and the feature, there is no mirror symmetry with respect to a radial axis linking a center of the body and a center of the feature in that section;

the feature extends parallel to the closest tangential direction at the periphery of the body;

the feature is configured as a recess in the body, preferably open on a face thereof;

the feature extends from a periphery of the body;

the isolator of the invention comprises at least two of said features, the features symmetrically arranged such that the isolator has a center of inversion;

the feature has a wedge-like shape;

the body and the feature are single-piece;

the isolator of the invention further comprises one or more waveguide in wave communication with the body, the said feature being off-rotated with respect to an average axis of the one or more waveguide;

the isolator of the invention further comprises at least one photonic crystal;

the isolator of the invention further comprises a metallic material adapted for plasmonic applications; and the isolator of the invention is configured as a microwave cavity.

In another aspect, the present invention is embodied as an integrated optics apparatus comprising two or more isolators, a first one of the isolators according to the invention and a second one of the isolators according to the invention too.

An isolator and other devices embodying the present invention will now be described, by way of non-limiting examples, and in reference to the accompanying drawings.

BRIEF DESCRIPTION OF SEVERAL VIEWS OF THE DRAWINGS

FIGS. 2.A-B, and 6-10.B show devices according to various embodiments of the present invention;

FIGS. 4.A-5.0 show results obtained by simulating wave propagation in the device of FIG. 2.A;

FIGS. 11.A-12.B compare the simulations of additional devices (FIGS. 11.B and 12.B are alternative embodiments of the present invention); and FIGS. 13.A-B provide detailed geometric description of two devices according to yet other embodiments.

DETAILED DESCRIPTION OF THE INVENTION

As an introduction to the following description, it is first pointed at general aspects of the invention, directed to an electromagnetic wave isolator. First, the isolator comprises a body (typically similar to a disk or ring resonator), which basically defines two directions of propagation of electromagnetic waves (e.g. two opposite, circular directions). Second, the isolator further comprises specific features lowering the symmetry conferred by the body. It may for instance consist of wedges extending outwardly and tangentially to the periphery of the body, such as to break the radial symmetry of the device. As a result of lowering the structural symmetry, wave propagation is essentially supported in one direction only. This isolator is typically coupled to waveguides. Many such isolators can be used in an integrated optics device. In contrast to known solutions, no ferroelectric materials or structural properties incompatible with CMOS are required. Here, unidirectional propagation is achieved thanks to the modified structural properties only. In addition, the fabrication of the device does not need substantially more steps than an of-the-shelf CMOS process, whereby low-cost mass fabrication can be contemplated.

As the dimensions of the present isolator simply scale with the resonance wavelength, various kinds of electromagnetic waves can be contemplated. The principles extend to acoustic waves too. Yet, for the sake of illustration, the following description merely focuses on the optical applications.

Figure 1:
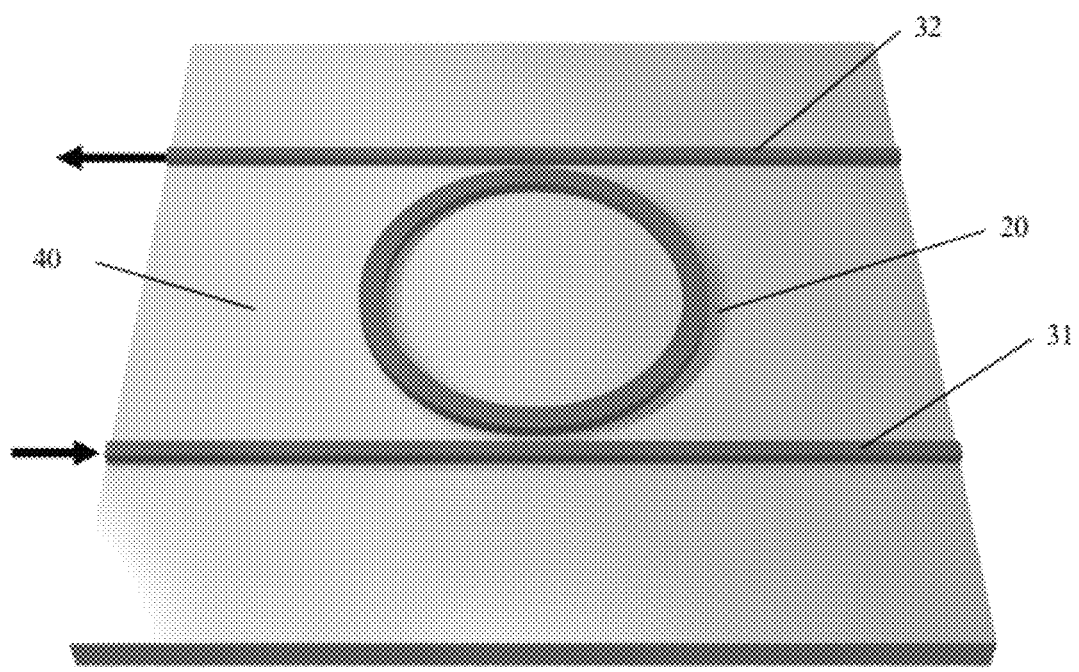
FIG. 1 depicts a prior art ring resonator.

The present invention shall easily be understood in view of a typical state-of-the-art ring resonator as depicted in FIG. 1. As usual, two waveguides 31, 32 are coupled such as to enable light communication with a ring resonator 20 (Si might be used in both cases), the diameter of which is typically 3-50 micrometers. The substrate 40 is made of e.g. $SiO_2$. Fabricating such a device can for instance make use of the known silicon-on-insulator (or SOI) technique.

Ideally, the structure has a high quality factor (or Q). Light can for instance be inputted/outputted as indicated by the duet of black arrows. Three other input/output duets are possible, owing to the symmetry of the device. Accordingly, such a device does not provide a preferred propagation direction on either side of the ring.

Next, in reference to FIG. 2.A, a similar device is disclosed, which can for instance make use of the same materials as in FIG. 1, except that the resonator is now augmented with two specific features 21, 22 breaking (i.e. lowering) the symmetry of the body 29. Still, two general directions of wave propagation are provided by the body 29, namely D1 and D2, which are opposite directions corresponding to the same circular loop defined by the body. Remarkably, the depicted arrangement results in that wave propagation is essentially supported in the direction D1 only.

Present inventors have realized that this effect can be obtained in different manners. For instance, a feature 21, 22 can be configured such as to extend tangentially to the periphery of the body. In particular, it may extend outwardly from the periphery but not necessarily. In fact, such a feature 21, 22 may be configured as a recess in the body 29, possibly such as to extend inwardly from the periphery, as shall be discussed later. Yet, it has been found that, in a number of the cases studied, the feature advantageously extends parallel to the closest tangential direction at the periphery of the body.

One could argue that such a feature is preferably configured such as to lower the radial symmetry of the body, if any. For example, if the body has a disk or ring shape, the feature could be designed asymmetric, such as to break the mirror symmetry with respect to the radial axis linking a center of the body and a centroid of the feature and this, in the plane of their largest common section. As a variant, the feature can be symmetric (e.g. have a rectangular shape) but arranged asymmetrically (e.g. tangentially), such as to break (or at least lower) the radial symmetry.

More generally, the feature is preferably configured such that the isolator is chiral in the plane containing the largest common section of the body and the feature. In geometry, a figure is said to be chiral if not identical to its mirror image (or if it cannot be mapped onto its mirror image by rotations and translations alone). In two dimensions (as is the case here since one considers a common section of the body and the feature), a figure which possesses an axis of symmetry is achiral. On the contrary, a figure that is not identical to its mirror image from either axis of symmetry is chiral. Thus, there is no axis of symmetry in the largest common section of the body and the feature (or in the average plane of the isolator). This shall be precisely illustrated later in reference to FIG. 13.A and 13.B.

In practice, several designs can be tried, if necessary as a trial-and-error process. One may first try a first design, lowering the overall symmetry (e.g. a rectangular shape), arrange it conveniently and check how it impacts the actual wave propagation. If not satisfying, still lower the shape symmetry (e.g. a triangular shape), etc., until a satisfying result is achieved.

Notwithstanding the exact configuration of the one or more feature present, the induced lowering of symmetry results in a loss of propagation which is more pronounced in one direction than in the other. In FIG. 2.A or 2.B, the loss of propagation occurs along the direction D2 (vertical-dashed, curved arrow), rather than in the opposite direction D1 (dotted arrow).

More in details, features such as depicted in FIG. 2.A can advantageously have a wedge-like shape, so that they shall hereafter be referred to as "wedges". Note that the tangential orientation of the wedges contribute to lower the radial symmetry, as noted above.

As said, various alternate designs and arrangements can be contemplated. A feature can for instance extend outwardly from the periphery of the body 29, which design turns out particularly advantageous for efficiently radiating waves off the body. This in turn leads to in a particularly efficient "blocking" of photons propagating along the direction D2. Accordingly, the latter direction may conveniently be referred to as the "blocking direction", D1 being logically the "non-blocking" direction.

In fact, one wedge is sufficient to achieve the desired effect, as shall be illustrated later in reference to FIGS. 7.A-12.B.

Increasing the number of wedges simply increases the efficiency (in a roughly linear fashion). In terms of efficiency vs. manufacturability, providing two wedges is a good compromise.

Furthermore, referring specifically to FIG. 2.B, wedges can be given a very simple shape, i.e. one thin end (e.g. tapered) and one thick end, which turns already efficient (the suppression ratio along D2 is larger than 10%, for a disk diameter of 3 μm, see below).

In addition, and as an alternative to FIGS. 2.A and 2.B, the said features can extend inwardly, rather than outwardly or even be configured as recesses provided in the body 29. Still, a similar effect can be obtained; this shall be discussed more in details in reference to FIGS. 7.A-12.B.

Comments are in order:
First, in the design of FIG. 2.A or 2.B, the isolator has a center of symmetry, which certainly impacts the wave propagation too.
Second, the wedges are advantageously further off-rotated with respect to the average axes of the waveguides, as depicted in FIG. 2.A or B, in order to favor a good coupling of the body with the waveguides.
Third, as evoked earlier, the body is not necessarily a disk or a ring, it can have an ellipsoidal shape or more generally define a loop, the two directions D1, D2 being the two opposite directions corresponding to that loop: the underlying effect remain essentially the same. Next, for evaluation of the above devices, finite difference time domain (FDTD) simulations have been performed with a numerical tool that solves Maxwell's equations ab initio. The simulations results can accordingly be regarded as the actual wave propagation. For instance, a ring resonator or isolator can be simulated, which is excited with a light pulse through a waveguide being at or close to the resonance frequency of the ring.

Figure 6:
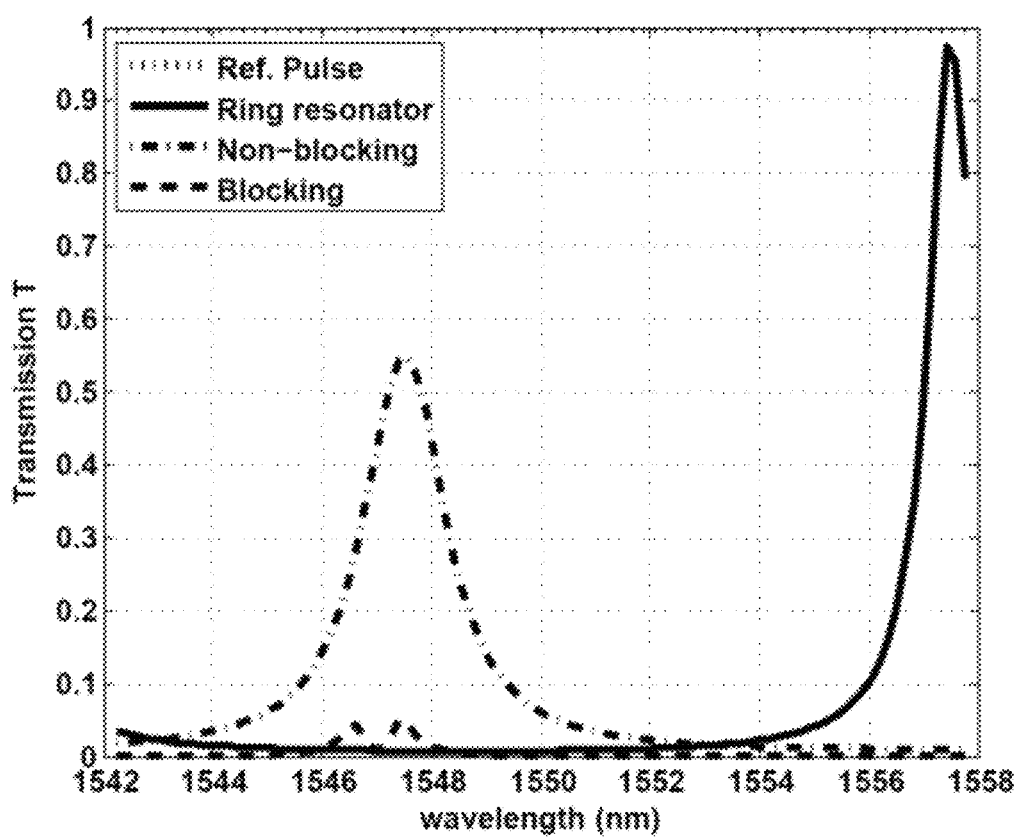

Such simulations have been carried out for the resonator of FIG. 1 (the simulation results are in FIG. 3) and the isolator of FIG. 2.A, both in the non-blocking direction (see FIG. 4.A-C) and in the blocking direction (see FIGS. 5.A-C). Additional results are shown in FIG. 6. Other simulations, i.e. directed to other types of devices, are shown in FIGS. 11.A-12.B. The radius considered for the device body is 7.75 μm; the excitation wavelength is 1550 nm and the spacing between waveguides and the body is 385 nm.

Figure 3:
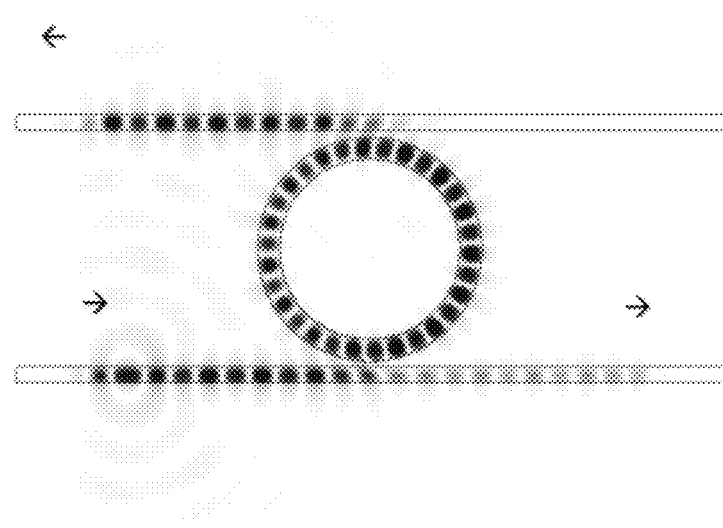
FIG. 3 illustrates results obtained by simulating wave propagation in that resonator.

First, the simulation results depicted in FIG. 3 relate to the ring resonator of FIG. 1 (without wedges, that is, as known form prior art). As illustrated, light is propagated from the source at the bottom-left input port to the top-left drop port. The wave transmission proceeds through the ring and then to the upper-left drop port. FIG. 3 further shows a plot of the corresponding in-plane electric field $|E_{xy}|$. Note that the gray levels used make that the two signs are indistinctly rendered.

FIG. 3 clearly shows the occurrence of light propagation from the input port to the drop port. Note that if the source would be located at the top-left port, the bottom-right drop port would exhibit same transmission characteristics: as the structure is symmetric, the law of reciprocity holds. At resonance, up to 100% transmission can be achieved.

In contrast to the known ring resonator of FIG. 3, the isolator of the invention has additional features configured such that the wave propagation is either supported of disturbed, depending on the direction. When light is propagating in the non-blocking direction, light is funneled into the ring without substantial off-radiation. This effect logically results in a high transmission, as to be discussed now in reference to FIG. 4.A-C.

FIGS. 4.A and 4.B show the variation of the (electromagnetic wave transmission) with respect to the wavelength λ, at the drop port and the input port, respectively. As seen, a high transmission is indeed achieved near the resonance wavelength.

Now, assume that the direction of the wedges is reversed, which amounts to reverse the input, that is, to consider an input from the bottom-right in FIG. 4.C. Such a situation is actually that illustrated in FIGS. 5.A-C, wherein light is now "invited" to wander off course, owing to the wedge configuration. Here, photons are manifestly stripped by the wedge, resulting in a loss of approximately 0.2% per wedge, as we shall see below.

In this respect, a tentative explanation follows. The split occurring in the blocking direction, see FIGS. 5.A-C, manifestly causes a substantial loss of energy in that direction. At the level of a wedge, the change in index of refraction (slightly increased), see FIG. 5.C, modes can be radiated off the wedges in the blocking direction. In the non-blocking direction (FIG. 4.C), modes are not radiated off but instead guided by the wedges.

For instance, the wedge design and function may perhaps evoke a highway ramp (exit/entrance ramp), that is, a short section of road which allows vehicles to enter or exit a highway. Similarly here, photons are either led to exit or re-enter the body, owing to the wedge configuration. The underlying physics are however probably much different.

Having this in mind, one further understands that the configuration and dimensions of a wedge may need to be tuned according to the resonance wavelength, if necessary as a trial-and-error process. As an indication yet, the scales in the representations of FIGS. 2.A, 2.B, and 11.B-12.B are respected. This is however not true in FIGS. 7.A-10.B, 13.A and 13.B.

Now, reverting to FIG. 5.C (blocking direction), if the body is designed such that light travels several hundreds of thousand times in the resonator before exiting ("High-Q cavity"), the light experiences e.g. 2×Q scattering events, which basically result in suppressing the one or more mode involved, as shown in FIG. 5.A-C. The intensity transmitted at the drop port (FIG. 5.A, grey curve) is much smaller than the reference intensity (dashed line), corresponding to that of FIG. 4.A. Accordingly, it can fairly be concluded that a device is obtained which supports the propagation of light in only one direction.

Next, FIG. 6 holds additional results of simulations, namely the transmission spectra. The plot in FIG. 6 comprises the pulse injected into the input port as a reference: it represents 100% of the spectral power (or 1 in the plot). The ring resonator of FIG. 1 (straight line) shows a transmission close to 100% at its resonance wavelength, namely 1557.5 nm. Owing to the wedges, the index of refraction of the device is slightly increased, whence the lower resonance wavelength (approximately 1547 nm). At that wavelength, the non-blocking direction (dotted-dashed) of the disclosed device has a high transmission, as opposed to the blocking direction (dashed curve).

The extinction ratio between the blocking and non blocking-direction has been computed. It appears that a structure with a quality factor Q of only 5700 causes up to 99% suppression, corresponding to a residual transmission of 1% only at a wavelength of 1547 nm. Further optimization of the structure (e.g. larger diameter with higher Q-value for more scattering events) can lead to even higher extinction efficiency, that is, close to 100%.

As evoked earlier, besides the wedges of FIG. 2.A, various other geometries have designed and simulated. For instance, simple wedge structures such as depicted in FIG. 2.B already result in more than 10% suppression in the blocking direction. Still other geometries shall be discussed later in reference to FIGS. 7.A-13.B.

The isolator according to the invention in advantageously in various optical devices, starting with integrated optics devices. The present isolator can indeed be considered as a fundamental building block for integrated optics in general and silicon photonics in particular. The invention accordingly encompasses an integrated optics device or apparatus built from several isolators such as described herein. Thus, the invention advantageously apply to applications such as chip-to-chip optical interconnects, wherein high physical integration density is needed.

At present, additional details are given which concern possible variants to the wedges.

As said, various wedge shapes and arrangements may be contemplated. This is further illustrated in FIGS. 7.A-10.B. As can be seen, either single or double wedge features can be provided at the periphery (FIGS. 7.A to 8.B, top views), in a similar fashion as those of FIG. 2.A or B. Conversely, the wedge features can be arranged as recesses (FIGS. 9.A to 10.B, perspective views), possibly augmented by external features (FIG. 10.B). Further, the features can be asymmetric, see e.g. FIG. 7.A or 9.A, or be symmetric but extend tangentially (FIG. 8.B), or still be both asymmetric and tangentially extended (FIG. 8.A). Finally, features need not be homogeneous, or limited in number, so that possible design variations are countless. Note however the lack of axis of symmetry in the average plane of the isolator in the depicted cases. As said, only one wedge suffices to obtain the desired blocking effect. In this respect, simulations comparable to those of FIGS. 3-5.0 have further been performed to illustrate this. In FIGS. 11.A-11.B, a ring-shaped body is excited. Yet, in FIG. 11.B, a wedged feature is provided which is configured as a recess extending from the inner periphery of the ring. As a result, much more energy is radiated off the resonated in the case of FIG. 11.B, compared to FIG. 11.A.

In FIGS. 12.A-12.B, the body is coupled to one waveguide. In the case of FIG. 12.B, a wedged feature is provided which extends from the outer periphery of the ring. A comparison of 12.A and 12.B immediately convinces of the blocking action of the wedged resonator (here in blocking configuration).

Furthermore, it has been noted earlier in this description that a wedge feature advantageously extends parallel to the closest tangential direction at the periphery of the body. What is meant, strictly speaking, is that
- the orthogonal projection
- of the main axis of the feature
- on the tangential direction at the periphery of the body containing the peripheral point the closest to the feature centroid
- is not zero.

Even, it is preferably larger than the projection on the radial axis. Incidentally, the above definition applies to an ellipsoidal body too.

Intuitively, the said "main axis" is suitable for representing the wedge in 1D. The main axis can for instance coincide with an average axis, a "principal axis", a "major axis" or still a "roll axis", depending on the exact shape of the wedge feature. This could be the longest axis of a box bounding the feature. This could further be the major axis of a wedge having an ellipsoidal section, extending tangentially and outwardly from the (inner or outer) periphery of the body. In contrast, no specific axis could be identified in a perfectly spherical feature, which would hardly convene for the present purpose.

FIGS. 13.A and 13.B exemplify the definition given above. In each case, a common section of both the body and the feature is represented. If the isolator has a plate shape, the section represented coincides with and end section. On the contrary, if the section of isolator varies along the transverse axis (perpendicular to the plane of the drawing), then the section represented is the largest common section of the body and the feature. In FIG. 13.A, the wedge extends tangentially and outwardly from the periphery, while it is configured as a recess in the example of FIG. 13.B. The dimensions and configurations are exaggerated, for the sake of explanation.

In each of the said figures, the wedged feature has a centroid and is associated with a main axis A. This axis is somehow suitable for representing the wedged feature in 1D. O denotes the center of the ellipsoidal body and $D_n$ is the radial direction linking O and $C_f$. CP stands for the point at the periphery of the body which is the closest from $C_f$ and $D_t$ denotes the tangential direction at this point. Next, P and $P_t$ are the orthogonal projections of the average axis A onto each of $D_n$ and $D_t$. As can be seen, the projection on the closest tangential direction is not zero. On the contrary, it is even larger than its radial counterpart $P_n$. Accordingly, it can be concluded that the wedged feature extends (merely) parallel to the closest tangential direction at the periphery of the body.

It can easily be seen that the wedge has no minor symmetry though $D_n$. In other words, the wedge has no radial symmetry, which contribute to lower the symmetry of the isolator (especially if the isolator is a ring or a disk). More generally, the wedge makes the isolator chiral in the depicted plane.

Moreover, as said, shapes other than ring or elliptical can be contemplated for the isolator body. Namely, the isolator could have a T-shape, augmented by an asymmetric feature, the said feature making the modified T-shape chiral.

Also, the isolator may further comprise at least one photonic crystal. The arrangement may thus comprise either one chiral photonic crystal or at least two photonic crystals asymmetrically coupled to each other.

Still, the isolator may else comprise a metallic material adapted for plasmonic applications, for instance to achieve a plasmonic nano-cavity (See e.g. Hill, M. T. et al. Nature Photon. 1, 589-594 (2007).

Finally, the isolator can be configured as a microwave cavity exhibiting the wedging feature and thus chirality.

While the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiment disclosed, but that the present invention will include all embodiments falling within the scope of the appended claims. For instance, other material than Si, InP or $SiO_2$ could be used.

The invention claimed is:

1. An electromagnetic wave isolator (10) comprising a body (29) having a given symmetry and defining two directions (D1, D2) of electromagnetic wave propagation, wherein the isolator further comprises one or more feature (21, 22) configured to lower the symmetry of the body, such that wave propagation is supported substantially more in one (D1) of the directions than in the other of the directions (D2), wherein the body (29) defines a loop, the two directions (D1, D2) being two opposite circular directions (D1, D2) corresponding to that loop, and the feature is further configured such that the isolator is chiral in the plane containing the largest common section of the body and the feature.

2. The isolator of claim 1, wherein the body (29) has an elliptical disk or ring shape, and wherein the isolator is configured such that, in the plane containing the largest common section of the body and the feature, there is no mirror symmetry with respect to a radial axis ($D_r$) linking a center (O) of the body and a center ($C_f$) of the feature in that section.

3. The isolator of claim 2, wherein the feature extends parallel to the closest tangential direction ($D_t$) at the periphery of the body.

4. The isolator of claim 1, wherein the feature is configured as a recess in the body.

5. The isolator of claim 1, wherein the feature extends from a periphery of the body.

6. The isolator of claim 1, comprising at least two of said features (21, 22), the features symmetrically arranged such that the isolator has a center of inversion.

7. The isolator of claim 1, wherein the feature has a wedge-like shape.

8. The isolator of claim 1, wherein the body and the feature are single-piece.

9. The isolator of claim 1, further comprising one or more waveguide (31, 32, 33) in wave communication with the body (29), the said feature being off-rotated with respect to an average axis of the one or more waveguide.

10. The isolator of claim 1, further comprising at least one photonic crystal.

11. The isolator of claim 1, further comprising a metallic material adapted for plasmonic applications.

12. The isolator of claim 1, configured as a microwave cavity.

13. An integrated optics device comprising two or more isolators, each isolator comprising: a body (29) having a given symmetry and defining two directions (D1, D2) of electromagnetic wave propagation, wherein the isolator further comprises one or more feature (21, 22) configured to lower the symmetry of the body, such that wave propagation is supported substantially more in one (D1) of the directions than in the other of the directions (D2), wherein the body (29) defines a loop, the two directions (D1, D2) being two opposite circular directions (D1, D2) corresponding to that loop, and the feature is further configured such that the isolator is chiral in the plane containing the largest common section of the body and the feature.

14. The isolator of claim 4, wherein said recess in the body is open on a face of said body.

15. The integrated optics device of claim 13, wherein the feature extends parallel to the closest tangential direction ($D_t$) at the periphery of the body.

16. The integrated optics device of claim 13, wherein the feature is configured as a recess in the body.

17. The integrated optics device of claim 16, wherein said recess in the body is open on a face of said body.

18. The integrated optics device of claim 13, wherein the feature extends from a periphery of the body.

* * * * *